3,395,999
METHOD OF TREATING GLASS IN
A MOLTEN SALT
Stanley S. Lewek, Corning, N.Y., assignor to Corning Glass Works, Corning, N.Y., a corporation of New York
No Drawing. Filed July 6, 1965, Ser. No. 469,919
2 Claims. (Cl. 65—30)

ABSTRACT OF THE DISCLOSURE

This invention relates to the strengthening of alkali metal silicate glasses through an ion exchange reaction utilizing a bath of molten alkali metal salt. This invention provides a means for minimizing chemical attack of the glass surface by the molten salts through the addition of diatomaceous earth to the bath.

---

Molten salt baths may be used in treating glassware for such diverse purposes as surface coloration, thermal treatment and chemical strengthening. In the latter practice, glass is strengthened by ion exchange, and a molten alkali metal salt serves as a source of ions for exchange. The present invention was devised as a solution to problems arising in such chemical strengthening practice, and therefore has particular utility for that purpose, although not so restricted.

In a typical method of ion exchange strengthening, an article composed of an alkali metal oxide-alumina-silica glass is treated in a molten salt bath composed primarily of the nitrate of a larger alkali metal ion. The treatment is continued for a period of time ranging up to 6-8 hours with the bath at a temperature in the range of 350-600° C., depending on the physical characteristics of the glass.

Experience has shown that, after such treatment, the surface of the glass article may be seriously deteriorated. In severe cases, the surface undergoes dissolution or chemical attack as evidenced by an etched or frosted appearance. In other cases, surface appearance is not altered, but there is a reduction in chemical durability as shown by film formation in a typical acid durability test. In any event, such surface deterioration may seriously interfere with subsequent use of the glass. It is therefore a primary purpose of the present invention to provide means for alleviating these undesired conditions.

Investigation has indicated that an alkali metal salt, particularly a nitrate, may undergo a slight degree of decomposition at elevated temperatures with the formation of the corresponding alkali metal oxide in the salt bath. On the theory that the glass surface reacts with such alkaline material, a variety of acidic type materials were investigated as additives to react with and neutralize such free alkali metal oxide.

The sulfates and chlorides of transistion metals, such as zinc and aluminum, were quite effective in some cases. However, such materials are hydroscopic, and it is difficult to obtain them in dry condition for use in a molten salt. Also, they tend to either volatilize or undergo a chemical reaction with evolution of fumes when added to a bath. Consequently, their use is undesirable, and may even become a health hazard.

Various oxide materials, such as sand, alumina, and boric oxide, were also investigated as possible additives. However, such materials are generally difficult to maintain in suspension and are surprisingly ineffective for the basic purpose of minimizing glass surface attack.

It has now been found that a naturally occurring material, diatomaceous earth, is surprisingly effective in alleviating the problem, and thereby minimizing etching attack and loss of chemical durability during strengthening or other salt bath treatment. Furthermore, this material apparently does not undergo any reaction with the primary salt component of the bath, and therefore remains effective over extended periods of time. It is easily maintained in supension in a molten salt and may be used in amounts up to about 5% before viscosity becomes a problem. Such amounts are generally adequate for present purposes.

The invention then is an improved method of treating a glass article in a molten salt bath wherein the improvement comprises introducing up to about 5% by weight of diatomaceous earth into the molten salt bath to minimize adverse effects of the bath on glass surface appearance and durability. The invention further comprehends an improved molten salt bath for use in treating glassware in which the bath comprises at least one alkali metal salt and up to about 5% of diatomaceous earth dispersed in the bath.

Diatomaceous earth is a naturally occuring, finely divided material composed primarily of silica, but usually containing up to a few percent each of alumina and soda. For present purposes, the material may be employed in its normally dry form without further treatment. It may be mixed with a granulated salt material prior to melting of the salt to form a treating bath, or it may be stirred into a molten bath after the salt has been melted.

Customarily, the amount of diatomaceous earth added will constitute at least 2% of the molten bath in order to provide adequately improved chemical durability in the treated glass surface. Larger additions up to about 5% by weight may be required with some glasses, and may be employed as a safety measure in other cases. Additions of this magnitude normally remain suspended in a molten salt for some period of time. However, stirring or blending means may be employed to insure uniform dispersion throughout a bath used over a period of several days. Additions larger than about 5% tend to produce a salt bath mixture that is too viscous for convenient handling of glass in the bath.

Additions of diatomaceous earth to chloride and sulfate baths which operate at temperatures above 600° C. may provide some benefits. However, primary benefits result from use in nitrate baths which normally operate at temperatures below 600° C. A nitrate bath is customarily used in the type of chemical strengthening practice wherein relatively large monovalent ions are exchanged for smaller monovalent ions. This type of exchange must be effected below the glass transformation range so that stresses thus induced are not relaxed by flow or rearrangement within the glass. The invention is therefore further described with particular reference to glasses and salt baths of the type used in such chemical strengthening practice.

The effectiveness of diatomaceous earth as a means of controlling glass surface attack in the nature of etching was determined on quarter-inch diameter cane test pieces produced from a $Li_2O$-$Na_2O$-$Al_2O_3$-$SiO_2$ glass. This glass had a composition particularly designed for strengthening by exchange of sodium for lithium ions within the glass. In this type of chemical strengthening, a formed glass article is immersed in an electrically heated bath of sodium nitrate for a period of time usually not over four hours.

For present test purposes, a bath of fresh sodium nitrate was provided with a 2% addition of sodium oxide. This simulated the condition thought to prevail in such a bath as nitrate decomposition occurs during use. The bath, thus intentionally contaminated, was then heated to 450° C., and a set of glass test cane was immersed in the bath for a period of four hours. On removal from the bath, the test pieces had an obviously frosted surface indicating a medium degree of etching. A further set of cane samples was then immersed in the bath for 4 hours after its temperature had been raised to 550° C. When this set was removed, a heavier frosted appearance indicated a more severe etching of the glass surface.

Thereafter, a 2% addition of diatomaceous earth was made by stirring a suitable amount of the material into the molten bath. The bath was maintained at 550° C. and sets of cane samples were immersed periodically over a period of eight days. When the cane samples were removed and cleaned, there was little or no visible evidence of etching or surface attack on the glass. This indicated that the addition of diatomaceous earth had substantially eliminated the etching or chemical reaction previously observed.

By way of comparison, small test baths of sodium nitrate were provided with a 2% addition of sodium oxide of intentional contamination and a 2% addition of pulverized sand or powdered boric oxide for test purposes. The baths were maintained at 550° C. and glass test cane were introduced for four hours. In each case, the cane surface was badly etched indicating that the acid oxide additive was much less effective than diatomaceous earth in controlling alkaline etching.

Chemical durability of a glass surface is commonly determined by an acid test in which a glass test piece is immersed in a 10% aqueous solution of HCl for a period of ten minutes at 25° C. The formation of a visually apparent film or haze on the glass surface during such immersion provides a qualitative indication of inadequate chemical durability for many optical purposes. Likewise, the absence of such film formation suffices to indicate adequate chemical durability in the surface.

Experience has shown that, even when a salt bath treatment does not cause visual etching or attack on a glass surface, there may still be such a loss of acid durability as to limit use of the strengthening process, particularly on optical or ophthalmic elements. Thus, a lens pressed from a glass having excellent acid durability, as indicated by the acid test referred to above, may undergo filming when tested after being strengthened by an ion exchange treatment in a molten salt bath. The addition of diatomaceous earth to molten salt bath is also effective in eliminating this adverse effect on chemical durability. This was illustrated by tests performed on small glass plates cut from sheets of $Na_2O$-$Al_2O_3$-$SiO_2$ glasses specially formulated for production of strengthened optical and flat glass elements.

In strengthening soda-containing glasses of this nature, it is customary to immerse the glass article in a molten potassium nitrate bath to effect an exchange of potassium for sodium ions within a surface layer of glass on the article. Typically, the glass article may be immersed in the bath for a period of 16 hours at 450° C. in a low temperature operation, or for 5 hours at 525° C. in a higher temperature treatment.

In one test, two potassium nitrate salt baths were provided and heated to a temperature of 525° C., One bath was provided with a 5% addition of diatomaceous earth while no such addition was made in the other bath. A set of test plates was then immersed in each bath for a period of three-quarters of an hour, removed and cleaned. The test plates were then immersed in a 10% hydrochloric acid solution for 10 minutes at 25° C. No film formation was observed on either set.

A further set of glass test pieces was then immersed in each salt bath for a period of 5 hours at the same temperature, that is 525° C. These samples were then removed, cleaned and given the indicated acid test. Formation of a film was observed on the samples treated in the pure nitrate bath, while no such film formation was observed on the samples immersed in the bath containing diatomaceous earth.

In order to further test the effectiveness of this material, three portions of potassium nitrate salt were taken from a large commercial bath which had been operating for several weeks. Each portion was sufficiently large to provide a small salt bath in which glass test pieces, as described above, could be immersed. One salt bath was operated without addition, while a second was provided with a 2% addition of diatomaceous earth, and the third a 5% addition. A set of $Na_2O$-$Al_2O_3$-$SiO_2$ glass samples was then treated in each bath for a period of 16 hours at 45° C. After such treatment, each set was removed, cleaned and subjected to the hydrochloric acid test described above. Film formation was observed on those samples which had been immersed in the bath without diatomaceous earth addition, while no film formation was observed on samples in either of the other two sets.

I claim:
1. In a method for strengthening an alkali metal silicate glass article by immersing the article in a molten alkali metal salt bath for a period of time, the improvement which comprises adding an effective amount up to about 5% by weight of diatomaceous earth to the bath to minimize deterioration of surface characteristics of the glass during the treatment.

2. In a method in accordance with claim 1 wherein about 2–5 by weight of diatomaceous earth is added to the bath.

References Cited

UNITED STATES PATENTS 3,293,016   12/1966   Cornelissen _____ 65—30

DONALL H. SYLVESTER, *Primary Examiner.*

R. L. LINDSAY, *Assistant Examiner.*